Jan. 3, 1956   L. W. YOUNG   2,728,988
CONTOUR FOLLOWING APPARATUS
Filed Nov. 8, 1952
Fig. 1.
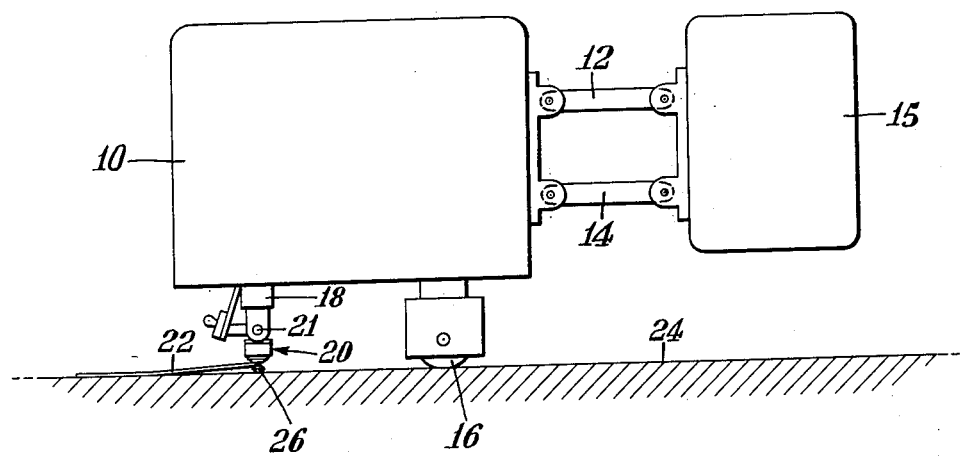
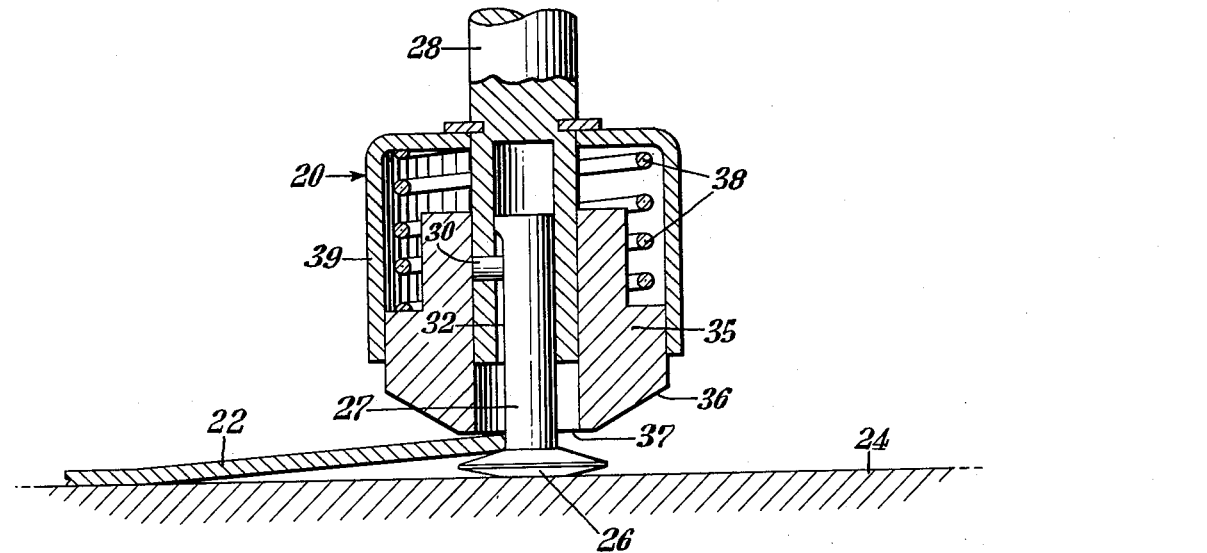
Fig. 2.
INVENTOR
Lloyd W. Young
BY
*D. C. Harrison*
ATTORNEY

United States Patent Office 2,728,988
Patented Jan. 3, 1956

2,728,988

CONTOUR FOLLOWING APPARATUS

Lloyd W. Young, Elizabeth, N. J., assignor to Union Carbide and Carbon Corporation, a corporation of New York Application November 8, 1952, Serial No. 319,527

4 Claims. (Cl. 33—23)

This invention relates to contour following apparatus, and constitutes an improvement in the apparatus disclosed in the copending application of Wendell L. Martin, Serial No. 127,107, filed November 14, 1949, now Patent No. 2,678,496, in which a tracer head is mounted on a conventional pantograph tracer mechanism. The tracer head comprises a motorized traction wheel for propelling a tracer around a pattern on a table. The tracer is pivotally mounted to swing toward or away from the pattern. The tracer head contains contacts and electric circuits for controlling the direction of movement of the traction wheel in response to pivotal movement of a tracing stylus which engages the edge of a template.

The tracer head is connected to the pantograph mechanism by parallel linkage, so that the tracer head floats as a unit with respect to the pantograph mechanism. However, inasmuch as the tracing stylus is a part of the tracer head which is supported by the traction wheel, the bottom of the tracing stylus and the bottom of the traction wheel are at the same level. Hence a surface irregularity such as a bump under the tracing stylus causes the wheel to lose traction and skid or stop. On the other hand, a bump under the traction wheel causes the tracing stylus to rise and escape or lift the pattern and generally tear the same, when made of desirably inexpensive material such as paper.

It is, therefore, the main object of the present invention to provide a floating mounting between the tracing stylus and the supporting means therefor on the traction wheel. A more particular object is to provide a yieldable connection between the tracing stylus and its pivotal support on the tracer head.

Other objects and features of novelty will be apparent from the following description and the accompanying drawings, in which:

Fig. 1 is a diagrammatic view of a tracer head connected by parallel linkage to a pantograph and having a traction wheel and tracer; and Fig. 2 is an enlarged view showing the floating mounting of the tracer according to the present invention.

As shown in Fig. 1, a tracer head 10 is connected by parallel links 12 and 14 to the bar 15 of a pantograph mechanism. The tracer head is provided with a motorized traction wheel 16 which is swiveled on a vertical axis about which it is steered, and a tracer mechanism 18 swiveled on a parallel vertical axis and geared thereto for steering therewith. A tracing stylus 20 is pivotally suspended on a pivot 21 from the tracer mechanism 18 which has electrical contacts connected to electric circuits for steering the traction wheel 16. A pattern 22 is mount on a table 24 on which the traction wheel rolls, and the stylus 20 has a foot 26 which rides on the table 24, and a stem 27 which engages the edge of the pattern 22.

According to the present invention, as shown in Fig. 2, the tracing stylus 20 comprises a hollow upper portion 28 bored out to receive the tracer stem 27 forming a telescopic joint or sliding connection to provide a floating mounting for the foot 26. A pin 30 forms a stop to prevent the stem from falling out of the bore, as well as to prevent rotation of the stem 27. The stem 27 is slabbed off to form a flat 32 which engages the edge of the pattern and follows along and turns with the template contour. The pin 30 engages the upper portion of the flat 32 to turn the stem 27 with it.

A hold down sleeve 35 is slidable on the upper tracing stylus portion 28, and has a conical lower surface 36 terminating in a lower rim 37 engaging the margin of the pattern 22 to hold it down onto the foot 26. A spring 38 mounted in a cover 39 secured to the portion 28 engages the upper portion of the sleeve 35 to urge it downwardly.

In operation, when the foot 26 rides over a bump in the table 24, the stem 27 slides up within the bore of the tracer 28, but maintains contact of the flat 32 with the edge of the pattern 22. The rim 37 of the hold down sleeve 35 prevents the pattern from buckling as the foot 26 rises. The pin 30 slidably engages the flat 32 on the stem 27 so that rotation of the stylus portion 28 will impart a like rotation to the stem 27. This stem 27 will float vertically over undulations in the surface of the tracing table 24. As a result of the floating mounting of the tracer, the entire mechanism functions as if the table had no surface irregularities.

I claim:

1. In a contour following apparatus having a tracing stylus adapted to engage a pattern on a table, a traction wheel for driving said stylus around said pattern, means for supporting said stylus on said driving wheel, said stylus having a foot adapted to ride over said table and to extend under the margin of said pattern and a stem having a flat portion above said foot to engage the side edge of said pattern margin on said foot, the improvement which comprises a floating mounting for said stem on said supporting means to permit said flat portion and foot and pattern margin resting thereon to move vertically with respect to said traction wheel to float over undulations in the surface of said table not engaged by said traction wheel, in combination with a hold down sleeve on said stylus slidable longitudinally of said stem down over said flat portion and having a downwardly facing bottom portion adapted to engage the top of the margin of the pattern resting on the top of said foot and hold it thereagainst.

2. In a contour following apparatus having a tracing stylus adapted to engage a pattern on a table, a traction wheel for driving said stylus around said pattern, means for supporting said stylus on said driving wheel, said stylus having a foot adapted to engage said table and to extend under the margin of said pattern and a stem having a flat side portion adapted to engage the edge of said pattern, and a pivot for suspending said stylus from said supporting means, the improvement which comprises a yieldable connection between said stylus and said stem to permit said foot with said pattern margin resting on top thereof and the edge of said pattern engaging said flat side portion to rise and fall relative to the level of said traction wheel to accommodate surface irregularities in said table, in combination with a hold down sleeve on said stylus slidable longitudinally of said stem and having a downwardly facing conical surface adapted to engage the top of said pattern margin resting on the top of said foot to guide the pattern edge into engagement with said flat side portion.

3. In a contour following apparatus having a tracing stylus adapted to engage a pattern on a table, a traction wheel for driving said stylus around the pattern, means for supporting said stylus on said driving wheel, said stylus having a foot adapted to engage and ride over said table and provided with a top portion adapted to extend under the margin of said pattern and a stem having a flat side portion above said foot to engage the side edge of said pattern margin on the top portion of said foot, the improvement which comprises a floating mounting for said stem on said supporting means to permit said flat portion and foot and pattern margin resting on the top of said foot to move vertically with respect to said traction wheel to float over undulations in the surface of said table not engaged by said traction wheel, in combination with a hold down sleeve on said stylus slidable longitudinally of said stem down over said flat portion and having a downwardly facing bottom portion adapted to engage the top of the margin of the pattern resting on the top of said foot and spring means urging said sleeve downwardly onto the pattern margin to hold it thereagainst.

4. In a contour following apparatus having a tracing stylus adapted to engage a pattern on a table, a traction wheel for driving said stylus around said pattern, means for supporting said stylus on said driving wheel, said stylus having a foot adapted to engage said table and to extend under the margin of said pattern and a stem having a flat side portion adapted to engage the edge of said pattern, and a pivot for suspending said stylus from said supporting means, the improvement which comprises a yieldable connection between said stylus and said stem to permit said foot with said pattern margin resting on top thereof and the edge of said pattern margin engaging said flat side portion to rise and fall relative to the level of said traction wheel to accommodate surface irregularities in said table, in combination with a hold down sleeve on said stylus slidable longitudinally of said stem and having a downwardly facing conical surface adapted to engage the top of said pattern margin resting on the top of said foot to guide the pattern edge into engagement with said flat side portion, and spring means urging said sleeve downwardly onto the pattern margin resting on the top of said foot and thereby urging said foot against the surface of said table.

References Cited in the file of this patent

UNITED STATES PATENTS

| | | |
|---|---|---|
| 978,486 | Reed | Dec. 13, 1910 |
| 1,357,859 | Godfrey | Nov. 2, 1920 |
| 1,544,655 | Krebs | July 7, 1925 |
| 2,349,954 | Geibig | May 30, 1944 |
| 2,600,728 | Bernard | June 17, 1952 |
| 2,678,496 | Martin | May 18, 1954 |

FOREIGN PATENTS

| | | |
|---|---|---|
| 455,311 | Italy | Feb. 22, 1950 |